(12) United States Patent
Lo

(10) Patent No.: US 10,127,823 B2
(45) Date of Patent: Nov. 13, 2018

(54) AUTOMATIC PAGE DETECTION METHOD FOR PRINT ARTICLE AND PRINT ARTICLE USING THE SAME

(71) Applicant: Generalplus Technology Inc., Hsinchu (TW)

(72) Inventor: Li Sheng Lo, Zhubei (TW)

(73) Assignee: Generalplus Technology Inc., Hsinchu (TW)

( * ) Notice: Subject to any disclaimer, the term of this patent is extended or adjusted under 35 U.S.C. 154(b) by 243 days.

(21) Appl. No.: 15/081,564

(22) Filed: Mar. 25, 2016

(65) Prior Publication Data

US 2016/0284224 A1 Sep. 29, 2016

(30) Foreign Application Priority Data

Mar. 27, 2015 (TW) .............................. 104110041 A

(51) Int. Cl.
*G09B 5/00* (2006.01)
*G09B 5/06* (2006.01)
(52) U.S. Cl.
CPC .................... *G09B 5/062* (2013.01)
(58) Field of Classification Search
CPC ..................................................... G09B 5/062
USPC ......................................................... 434/316
See application file for complete search history.

(56) References Cited

U.S. PATENT DOCUMENTS

| | | | | |
|---|---|---|---|---|
| 3,522,665 A * | 8/1970 | Kalt | ......................... | G09B 7/08 434/317 |
| 5,191,329 A * | 3/1993 | Samreus | ............... | G06F 3/0238 341/20 |
| 5,631,883 A * | 5/1997 | Li | ......................... | G09B 5/062 369/64 |
| 5,645,432 A * | 7/1997 | Jessop | ................. | A63F 3/00643 434/308 |
| 6,108,211 A * | 8/2000 | Diessner | ................ | H01R 12/62 200/512 |
| 6,491,220 B1 * | 12/2002 | May | ......................... | G06F 3/03 235/435 |
| 6,763,995 B1 * | 7/2004 | Song | ..................... | G06F 3/0224 235/375 |

(Continued)

FOREIGN PATENT DOCUMENTS

CN 202632565 U 12/2012

*Primary Examiner* — Sam Yao
*Assistant Examiner* — Michael Humphrey
(74) *Attorney, Agent, or Firm* — Muncy, Geissler, Olds & Lowe, P.C.

(57) ABSTRACT

An automatic page detection method for a print article and a print article using the same are provided in the present invention. The automatic page detection method for the print article includes the steps of: disposing N receiving units at N first preset position of a cover of the print article; disposing a transmitting unit at the second preset position of the cover of the print article; disposing N thin conductors respectively at N pages, wherein the a thin conductor is disposed between $K^{th}$ first preset position of the $K^{th}$ page and the second preset position of the $K^{th}$ page; emitting a detection signal by the transmitter; and determining the present page according to the receiving unit(s) of the N receiving units which receive(s) the detection signal.

23 Claims, 11 Drawing Sheets

(56) References Cited

U.S. PATENT DOCUMENTS

| | | | | |
|---|---|---|---|---|
| 7,290,700 | B2* | 11/2007 | Song | G06F 3/0224 235/375 |
| 7,428,990 | B1* | 9/2008 | Milford | G06K 7/081 235/435 |
| 9,367,715 | B2* | 6/2016 | Li | G06K 19/07749 |
| 9,489,856 | B2* | 11/2016 | Herz | G09B 5/06 |
| 2002/0130668 | A1* | 9/2002 | Blades | G01R 1/07 324/536 |
| 2003/0116620 | A1* | 6/2003 | Song | G06F 3/0224 235/375 |
| 2007/0046483 | A1* | 3/2007 | White | G09B 5/00 340/686.1 |
| 2008/0238706 | A1* | 10/2008 | Kenwright | G06F 3/044 340/686.6 |
| 2008/0295369 | A1* | 12/2008 | Chen | G09F 27/00 40/343 |
| 2011/0059426 | A1* | 3/2011 | Mamigonians | G09B 5/062 434/317 |
| 2011/0127428 | A1* | 6/2011 | Hill | G01N 23/2255 250/307 |
| 2012/0187952 | A1* | 7/2012 | Coombs | G09B 5/062 324/519 |
| 2013/0316321 | A1* | 11/2013 | Herz | G09B 5/06 434/317 |
| 2013/0337427 | A1* | 12/2013 | Zhong | G09B 5/06 434/317 |
| 2015/0302226 | A1* | 10/2015 | Li | G06K 19/07749 235/451 |

* cited by examiner

AUTOMATIC PAGE DETECTION METHOD FOR PRINT ARTICLE AND PRINT ARTICLE USING THE SAME

This application claims priority of Application No. 104110041 filed in Taiwan, R.O.C. on 27 Mar. 2015 under 35 U.S.C. § 119; the entire contents of all of which are hereby incorporated by reference.

BACKGROUND OF THE INVENTION

Field of the Invention

The present invention relates in general to a page detection technology for printed matter, and more particularly to an automatic page detection method for print article and a print article using the same.

Related Art

As living standards is improved, more and more parents start to focus on children's education, and they also start to seriously consider the issue of education of preschool children. In this respect, more and more preschoolers puzzle electronic products appear in the market. But most of these products are consumer electronics products. They may cause children's physical, psychological and spiritual aspects of damage in use for a long period. Further, it will cause a decline in children's reading ability. Thus, the paper book is still the main tool for early childhood education.

In order to enhance the fun of children's books and toys property, and to raise children's interest in books, an e-book appears in the market. The e-book has interactive function, such as a button for sounding the content in a page of the book. Moreover, in order to identify the page turned by user, a page detection technology is provided in the prior art. FIG. 1 illustrates a diagram depicting a page detection device provided by Chinese utility model patent No. CN202632565U. In the page detection device, an Infrared ray reading circuit 102, and there is a bar code 101 in the right side of every pages. It is determine the present page turned by user by reading the bar code of the page. This method need to dispose a block thicker than the book to dispose the Infrared ray reading circuit 102 to read each page's bar code 101.

FIG. 2 illustrates a drawing depicting an optical detection type page detection device according to a prior art. Referring to FIG. 2, in this figure, a nine pages book is provided for example. The optical detection type page detection device utilizes 9 photo sensors 201, such as CDS (cadmium sulfide), photo diode. When user turns to a specific page, the specific page would cover the specific number of photo sensors. Thus, a nine pages book needs nine photo sensors. In addition, each page respectively has different apertures, and different pages would obscure different number of photo sensors to determine the present page.

Although the design of the optical detection type page detection device is simple, it requires a large number of photo sensors to achieve the page detection. Those photo sensors are the main costs. Also, CDS has been strictly restricted in the EU and the United States. Further, the pages in the book need to be drill through holes; it would increase an extra cost.

SUMMARY OF THE INVENTION

It is therefore an objective of the present invention to provide an automatic page detection method for print article and a print article using the same, wherein the conductor is built in each page and the conduction path for electrical signal is provided such that the page can be determined by transmitting circuit and receiving circuit.

In view of this, the present invention provides an automatic page detection method, adapted for a print article, wherein the print article includes a plurality of pages, wherein the automatic page detection method includes: providing N receiving units at N first preset positions in a specific page of the print article; providing a transmitting unit at a second preset position in the specific page of the print article; providing N thin conductors to N pages, wherein a thin conductor is set between $K^{th}$ first preset position of $K^{th}$ page and the second position of $K^{th}$ page; sending a detection signal from the transmitting unit; and determining a present page according to a receiving unit of N receiving units in which the receiving unit receives the detection signal, wherein N and K are natural number, and $K<=N$.

The present invention further provides an automatic page detection method, adapted for a print article, wherein the print article includes a plurality of pages, wherein the automatic page detection method includes: providing N transmitting units at N first preset positions in a specific page of the print article; providing a receiving unit at a second preset position in the specific page of the print article; providing N thin conductors to N pages, wherein a thin conductor is set between $K^{th}$ first preset position of $K^{th}$ page and the second position of $K^{th}$ page; respectively outputting detection signals from the transmitting units, wherein $I^{th}$ transmitting unit outputs $I^{th}$ detection signal; and determining a present page according to an index number of the detection signal received by the receiving unit, wherein N, I and K are natural number, and $K<=N$ and $I<=N$.

The present invention further provides a print article. The print article includes N pages and a specific page. Each of the N pages includes N first preset positions and a second preset position. Each page includes a thin conductor, wherein the thin conductor is disposed between $K^{th}$ first preset position of $K^{th}$ page and the second position of $K^{th}$ page. The specific page includes N receiving units, a transmitting unit and a control circuit. The N receiving units are respectively disposed on N first present positions. The transmitting unit is disposed on the second position. The control circuit is respectively coupled to the transmitting unit and N receiving units. The control circuit controls the transmitting unit to output a detection signal, and the control circuit determines a present page according to a receiving unit of N receiving units in which the receiving unit receives the detection signal, wherein N and K are natural number, and $K<=N$.

The present invention further provides a print article. The print article includes N pages and a specific page. Each page includes N first preset positions and a second preset position, wherein each page comprises a thin conductor, wherein the thin conductor is disposed between $K^{th}$ first preset position of $K^{th}$ page and the second position of $K^{th}$ page. The specific page includes N transmitting units, a receiving unit and a control circuit. N transmitting units are respectively disposed on N first present positions. The receiving unit is disposed on the second position. The control circuit is coupled to the receiving unit and N transmitting units. The control circuit controls the N transmitting units to respectively output a first detection signal to $N^{th}$ detection signal, and the control circuit determines a present page according to an index number of received detection signal received by the receiving unit, wherein N and K are natural number, and $K<=N$.

In the automatic page detection method for print article and the print article in accordance with a preferred embodiment of the present invention, the $J^{th}$ page further includes (N−J) second thin conductors, respectively disposed on the $(J+1)^{th}$ first preset position to $N^{th}$ first preset position in $J^{th}$ page for providing signal transmission paths, wherein J is a natural number and J<N. In a preferred embodiment, the transmitting unit includes a transistor, a resonant circuit and a transmitting conductor. The transistor includes a base terminal, a emitter terminal and a collector terminal, wherein the base terminal of the transistor is coupled to the control circuit for receiving a resonant pulse, wherein the emitter terminal of the transistor is coupled to a common voltage. The resonant circuit includes a first terminal and a second terminal, wherein the first terminal of the resonant circuit is coupled to a power voltage, and the second terminal of the resonant circuit is coupled to the collector terminal of the transistor. The transmitting conductor is coupled to the second terminal of the resonant circuit.

In the automatic page detection method for print article and the print article in accordance with a preferred embodiment of the present invention, the resonant circuit includes a resistor, a capacitor and an inductor. The resistor includes a first terminal and a second terminal, wherein the first terminal of the resistor is coupled to the first terminal of the resonant circuit, and the second terminal of the resistor is coupled to the second terminal of the resonant circuit. The capacitor includes a first terminal and a second terminal, wherein the first terminal of the capacitor is coupled to the first terminal of the resonant circuit, and the second terminal of the capacitor is coupled to the second terminal of the resonant circuit. The inductor includes a first terminal and a second terminal, wherein the first terminal of the inductor is coupled to the first terminal of the resonant circuit, and the second terminal of the inductor is coupled to the second terminal of the resonant circuit.

In the automatic page detection method for print article and the print article in accordance with a preferred embodiment of the present invention, each receiving unit includes a receiving conductor, a filtering unit, a signal amplifying unit and a peak detection unit. The filtering unit is coupled to the receiving conductor, for performing a bandpass filter to output a bandpass signal. The signal amplifying unit includes an input terminal and an output terminal, wherein the output terminal of the signal amplifying unit is coupled to the filtering unit, for amplifying the bandpass signal to output the amplified bandpass signal. The peak detection unit is used for detecting the amplified bandpass signal to output a detection pulse.

In the automatic page detection method for print article and the print article in accordance with a preferred embodiment of the present invention, the transmitting unit includes a pulse generating circuit and a transmitting conductor. The pulse generating circuit includes an input terminal and an output terminal, wherein the input terminal of the pulse generating circuit is coupled to the control circuit, for output a pulse. The transmitting conductor is coupled to the output terminal of the pulse generating circuit. In addition, $I^{th}$ receiving unit includes $I^{th}$ receiving conductor which is coupled to the $I^{th}$ input/output pin. The impedance element is between the $(I+1)^{th}$ input/output pin and the $I^{th}$ input/output pin. When the $(I+1)^{th}$ input/output pin charges the $I^{th}$ input/output pin to a specific voltage, the control circuit controls the pulse generating circuit to output the pulse, and the control circuit determines the present page according to whether the voltage of the $I^{th}$ input/output pin is smaller than the specific voltage or not.

The spirit of the present invention is to provide wireless signal transmitting unit(s) and wireless signal receiving unit(s), and to provide thin conductor(s) in the page(s) to be detected for providing a signal transmission path. Thus, the present page turned by user can be detected by the transmission of the wireless detection signal through the thin conductor and whether the wireless signal receiving unit receives the wireless detection signal or not.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1:
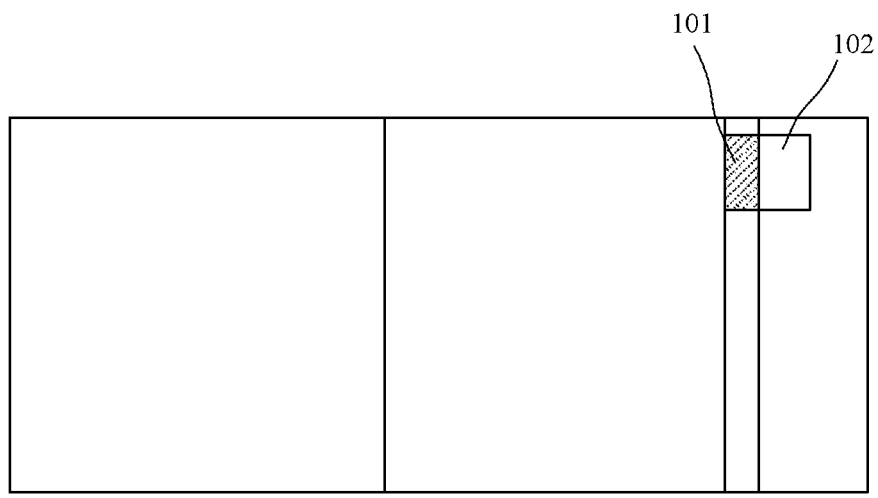
FIG. 1 illustrates a diagram depicting a page detection device provided by Chinese utility model patent No. CN202632565U.
Figure 2:
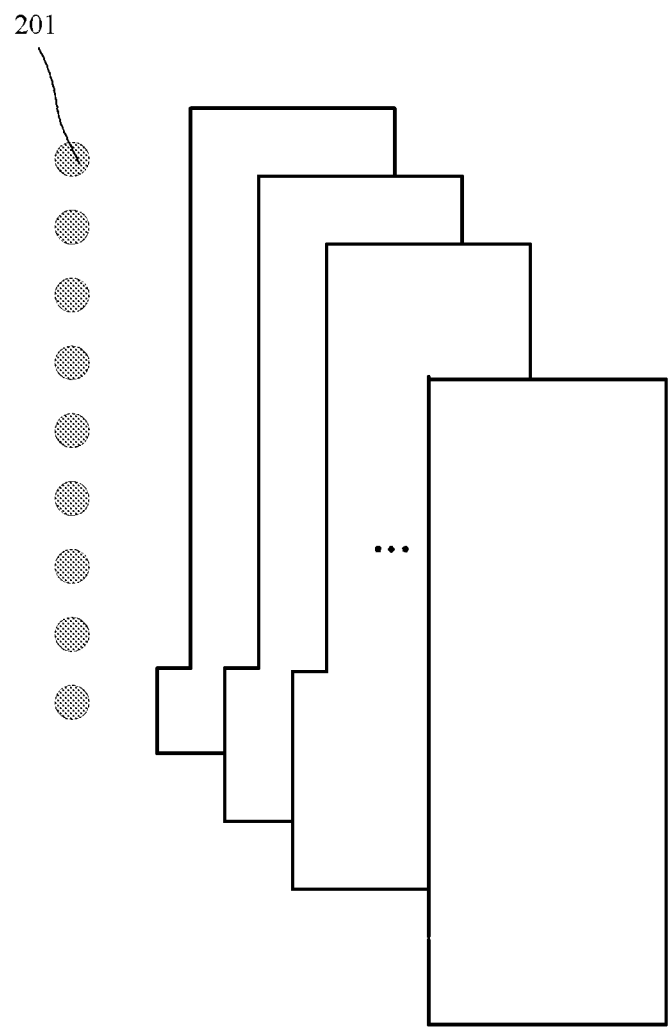
FIG. 2 illustrates a drawing depicting an optical detection type page detection device according to a prior art.
Figure 3:
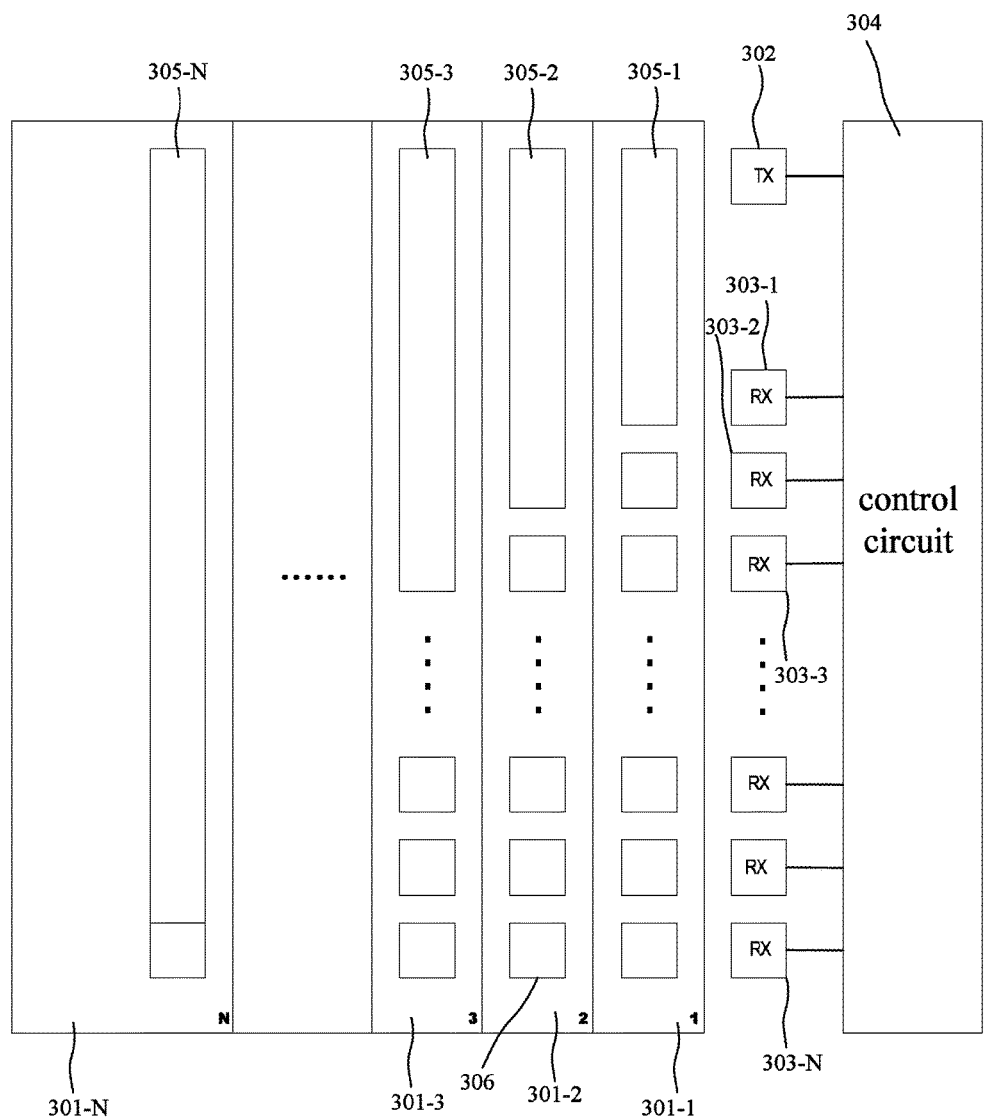
FIG. 3 illustrates a system block diagram depicting a print article according to a preferred embodiment of the present invention.

FIG. 3 illustrates a system block diagram depicting a print article according to a preferred embodiment of the present invention. Referring to FIG. 3, the print article includes N pages 301-1~301-N, a transmitting unit 302, N receiving units 303-1~303-N and a control circuit 304. In addition, in N pages, first to $N^{th}$ pages respectively include rectangular first thin conductor 305-1~305-N and N−1 square second thin conductors 306. Generally speaking, the transmitting unit 302, the receiving units 303-1~303-N and the control unit 304 are disposed in the front cover page or the back cover page. People having ordinary skill in the art should know that the abovementioned thin conductors can be implemented by thin-film metal, conductive inks, conductive paint, conductive coating, etc. The detail description is omitted.

The first thin conductors 305-1~305-N and the second thin conductor 306 are served as the signal transmission paths. Referring to FIG. 3, when the print article is shut, the disposed positions of the first thin conductors respectively in the first to $N^{th}$ pages 301-1~301-N are overlapped with the transmitting unit 302 and at least one receiving unit. For example, when the first page 301-1 covers the cover page having the transmitting unit 302, the receiving units 303-1~303-N and the control circuit 304, the first thin conductor 305-1 in the first page 301-1 would cover the transmitting unit 302, the first receiving unit 303-1 and the second receiving unit 303-2.

Figure 4:
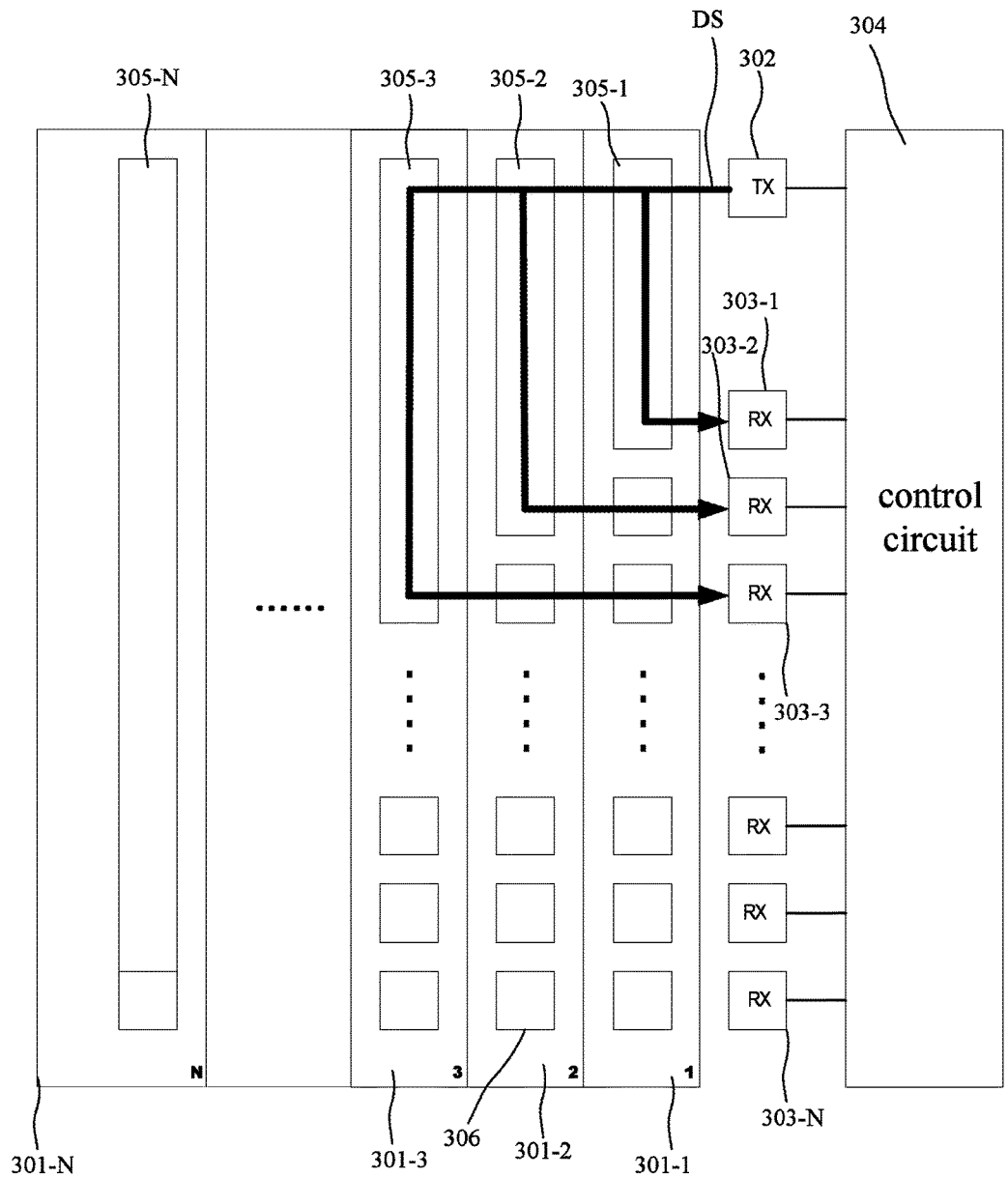
FIG. 4 illustrates a drawing depicting a page detection function performed by the print article according to a preferred embodiment of the present invention.

FIG. 4 illustrates a drawing depicting a page detection function performed by the print article according to a preferred embodiment of the present invention. Referring to FIG. 4, it is assumed that user turns to the page 3. The control circuit 304 would control the transmitting circuit 302 to send the detection signal DS. Meanwhile, the detection signal DS passes through the first thin conductors 305-1, 305-2, 305-3 such that the detection signal DS is transmitted to the receiving units 303-1, 303-2 and 303-3. When the control circuit 304 controls the transmitting circuit 302 to send the detection signal DS, the control circuit 304 determines whether the receiving units 303-1~303-N receives the detection signal DS or not in the same time. When the control circuit 304 determines that, the receiving units 303-1, 303-2 and 303-3 receive the detection signal DS, the control circuit 304 determines that user turns to page 3 of the print article.

Figure 5:
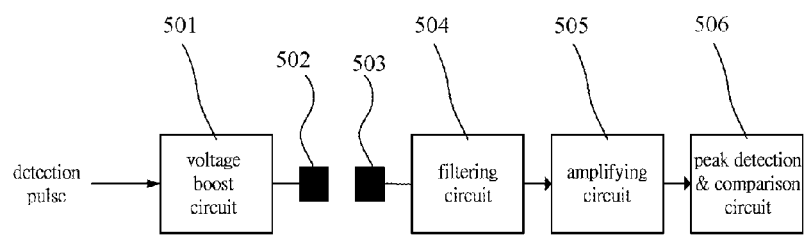
FIG. 5 illustrates a system block diagram depicting a transmitting unit and a receiving unit of the print article according to a preferred embodiment of the present invention.

FIG. 5 illustrates a system block diagram depicting a transmitting unit and a receiving unit of the print article according to a preferred embodiment of the present invention. Referring to FIG. 5, in this embodiment, the transmitting unit includes a voltage boost circuit 501 and a transmitting conductor 502. The receiving unit includes a receiving conductor 503, a filtering circuit 504, an amplifying circuit 505, a peak detection and comparison circuit 506. The control circuit 304 output a detection pulse, through the voltage boost circuit 501, the swing of the detection pulse is amplified. And then, the transmitting conductor 502 emits the detection signal DS. The receiving conductor 503 receives the detection signal DS, through the filtering circuit, the noise of the detection signal DS is filtered. And then the amplifying circuit 505 amplifies the detection signal DS. Then, the peak detection and comparison circuit 506 converts the amplified detection signal DS to the pulse signal for identifying by the control circuit.

Figure 6:
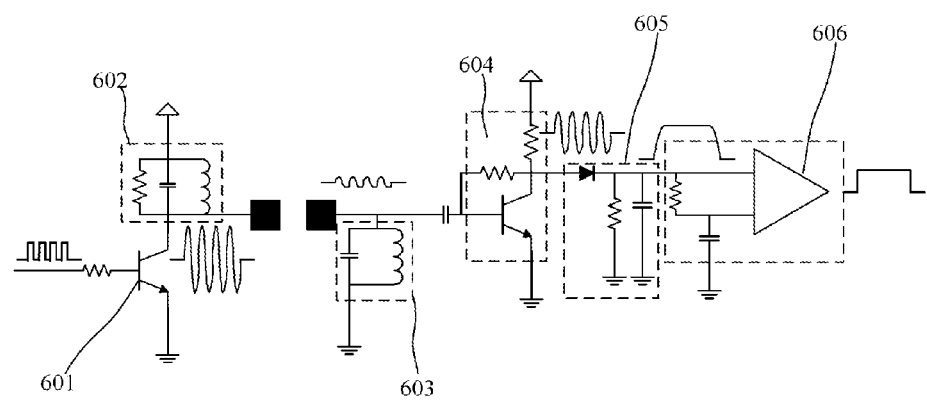
FIG. 6 illustrates a detail circuit diagram depicting a transmitting unit and a receiving unit of the print article according to a preferred embodiment of the present invention.

FIG. 6 illustrates a detail circuit diagram depicting a transmitting unit and a receiving unit of the print article according to a preferred embodiment of the present invention. Referring to FIG. 6, in this embodiment, the voltage boost circuit 501 is implemented by a transistor 601 and RLC resonant circuit 602. When the control circuit 304 sends the detection pulse to the base terminal of the transistor 601, the frequency of the detection pulse is about equal to the resonant frequency of the RLC resonant circuit 602. Thus, the detection signal DS emitted by the transmitting conductor 502 would be a sinusoidal wave having a great amplitude.

In addition, in this embodiment, the filtering circuit 504 is a bandpass filter 603 implemented by inductor and capacitor. The passband of the bandpass filter 603 covers the frequency of the detection signal DS for filtering the noise. The amplifying circuit 505 is a common emitter amplifier 604 with collector feedback configuration, for amplifying the received detection signal DS. The peak detection and comparison circuit 506 is implemented by a quasi-peak detector 605, which is implemented by diode, resistor and capacitor, and a comparison circuit 606, which is implemented by resistor, capacitor and amplifier.

According to the implementation of the circuit, when the control circuit 304 outputs the detection pulse, the I/O (input/output) pin of the control circuit 304 receives the logic high voltage output by the comparison circuit 605, it means that the receiving unit corresponding to the I/O pin receives the detection signal DS. Thus, the control circuit can determine the present page to which user turns.

In the abovementioned embodiment, a transmitting unit with multiple receiving units is taken as example. However, to exam the detail circuit, the cost of the receiving unit is much higher than the cost of the transmitting unit. Further, the receiving unit has too many elements. It would cause that the cover becomes too thick. In order to solve those problems, the following embodiment adopts one receiving unit with multiple transmitting units to implement the present invention.

Figure 7:
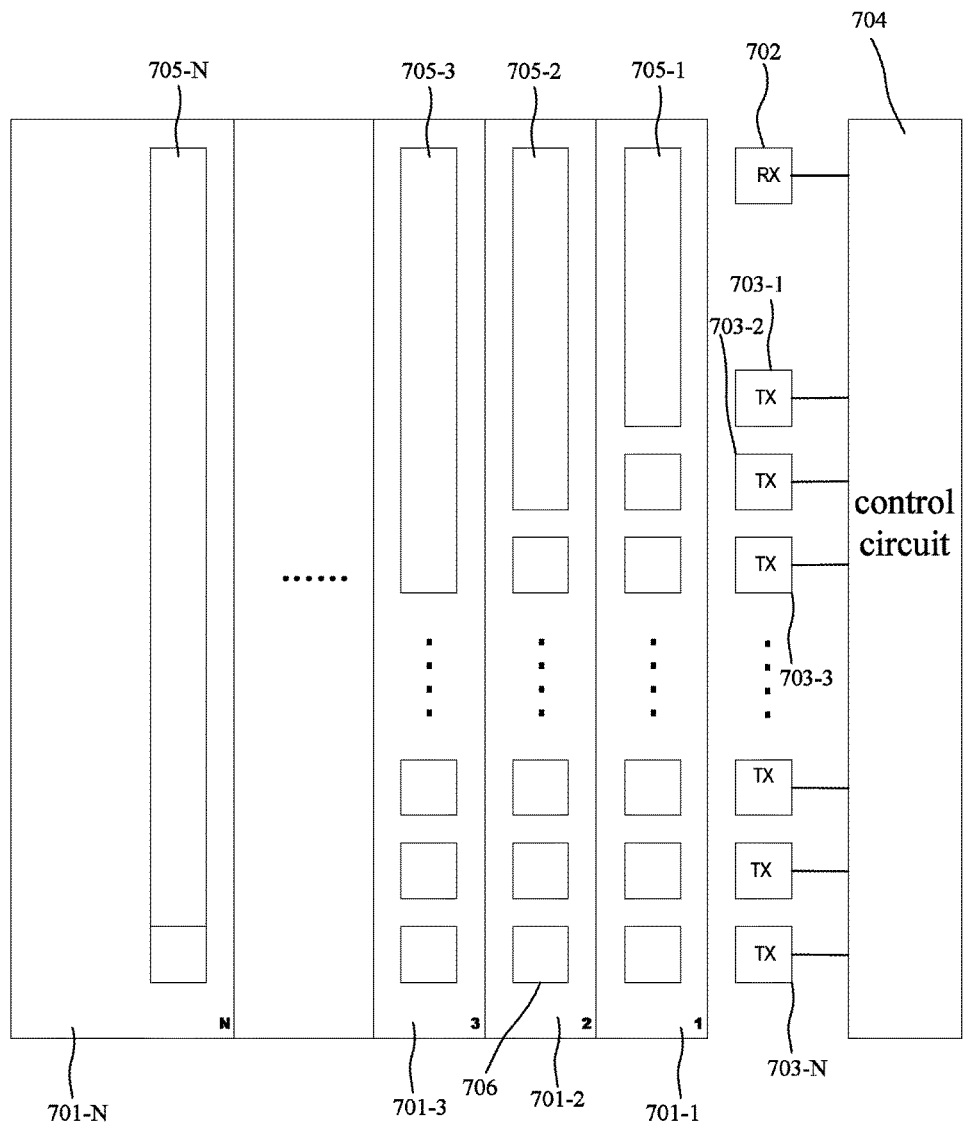
FIG. 7 illustrates a system block diagram depicting a print article according to a preferred embodiment of the present invention.

FIG. 7 illustrates a system block diagram depicting a print article according to a preferred embodiment of the present invention. Referring to FIG. 7, similarly, the print article includes N pages 701-1~701-N, a receiving unit 702, a plurality of transmitting units 703-1~703-N and a control circuit 704. In the N pages, the first to $N^{th}$ pages include rectangular first thin conductors 705-1~705-N respectively and the first to $N^{th}$ pages also include one to N−1 square second thin conductors 706 respectively. Generally speaking, the receiving unit 702, the transmitting units 703-1 to 703-N and the control circuit 704 are disposed in the front cover or the back cover.

Similarly, the first thin conductors 705-1~705-N and the second thin conductors 706 are served as the signal transmission paths. Referring to FIG. 7, when the print article is shut, the disposed positions of the first thin conductors 705-1~705-N respectively in the first to $N^{th}$ pages is overlapped with a receiving unit 702 and at least one transmitting unit. For example, when the first page 701-1 covers the cover having the receiving unit 702, the transmitting units 703-1~703-N and the control circuit 704, the first thin conductor 705-1 of the first page 701-1 covers the receiving unit 702 and the first transmitting unit 703-1. Similarly, when the second page 701-2 covers the cover having the receiving unit 702, the transmitting units 703-1~703-N and the control circuit 704, the first thin conductor 705-2 of the second page 701-2 covers the receiving unit 702, the first transmitting unit 703-1 and the second transmitting unit 703-2.

Figure 8:
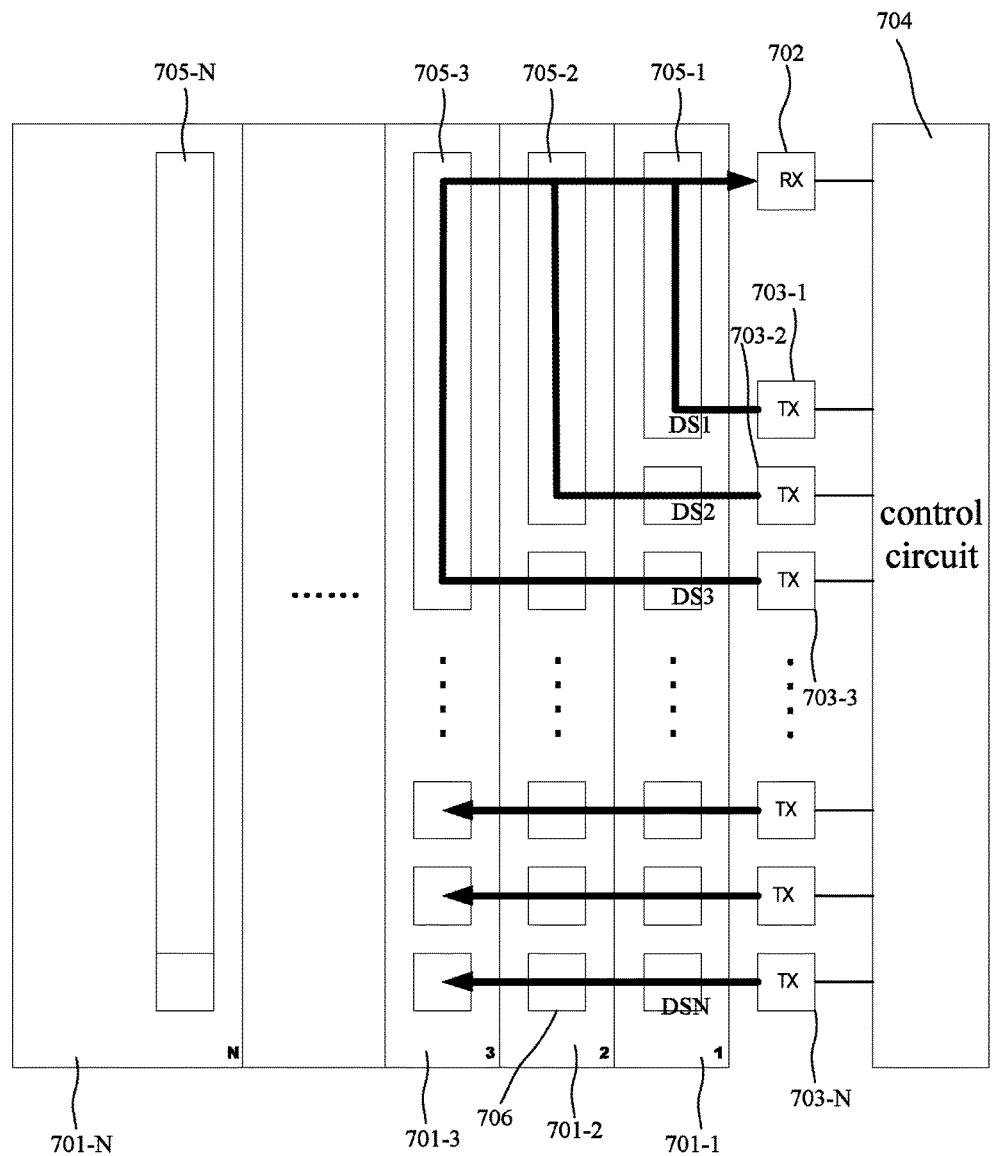
FIG. 8 illustrates a drawing depicting a page detection function performed by the print article according to a preferred embodiment of the present invention.

FIG. 8 illustrates a drawing depicting a page detection function performed by the print article according to a preferred embodiment of the present invention. Referring to FIG. 8, it is assumed that user turns to page 3. The control circuit 704 controls each of transmitting units to sequentially emit detection signals DS1~DSN in a detection period. Further, the detection period is divided into N sub-detection period. In the first sub-detection period, the first transmitting unit 703-1 emits the detection signal DS1, in the second sub-detection period; the second transmitting unit 703-2 emits the detection signal DS2, and so on. At this time, the detection signals pass the second thin conductors 706 and the first thin conductors 705-1~705-3 and the detection signals DS1~DS3 are transmitted to the receiving unit 702. When the control circuit 704 controls the transmitting units 703-1~703-N to respectively emit the detection signals DS1~DSN, the control circuit 704 determines the detection signals received by the receiving units in the same time. When the control circuit 704 determines that the receiving unit 702 receives the detection signals DS1, DS2 and DS3, the control circuit 704 can determine that the user turns to page 3 of the print article.

In the abovementioned embodiment, if the signal strength is strong enough and the page number is small enough, the second thin conductors 706 or 306 may not be necessary. However, if the page number is too large, the page is too thick, or the signal strength is too weak, the second thin conductors 706 or 306 are necessary. The disadvantage of the abovementioned embodiments is that the element count of transmitting unit and receiving unit is too large and they has to be implemented by discrete circuit. It cause that the cover of the print article requires a certain thick. In the following embodiment, the use of the discrete circuits can be reduced. In order to reduce the discrete circuit, the more complex control method would be required, and the concept of hardware and software co-design is adopted.

Figure 9:
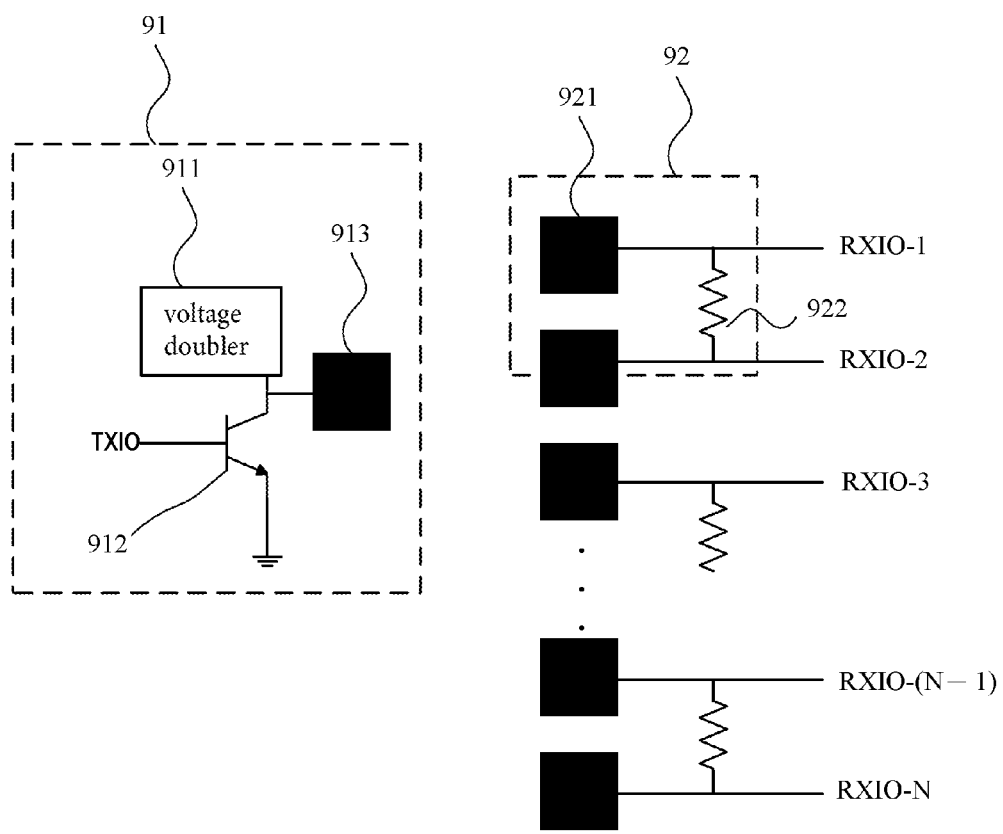
FIG. 9 illustrates a circuit diagram depicting a transmitting unit and a plurality of receiving units corresponding to the print article in FIG. 3 according to a preferred embodiment of the present invention.

FIG. 9 illustrates a circuit diagram depicting a transmitting unit and a plurality of receiving units corresponding to the print article in FIG. 3 according to a preferred embodiment of the present invention. Referring to FIG. 9, in this embodiment, the transmitting unit 91 is implemented only by a voltage doubler 911, a transistor switch 912 and a transmitting conductor 913, and the receiving units 92 are implemented only by receiving conductors 921, resistors 922 and I/O ports RXIO-1~RXIO-N of the control circuit 304, wherein a resistor 922 is disposed between two I/O ports.

Figure 10:
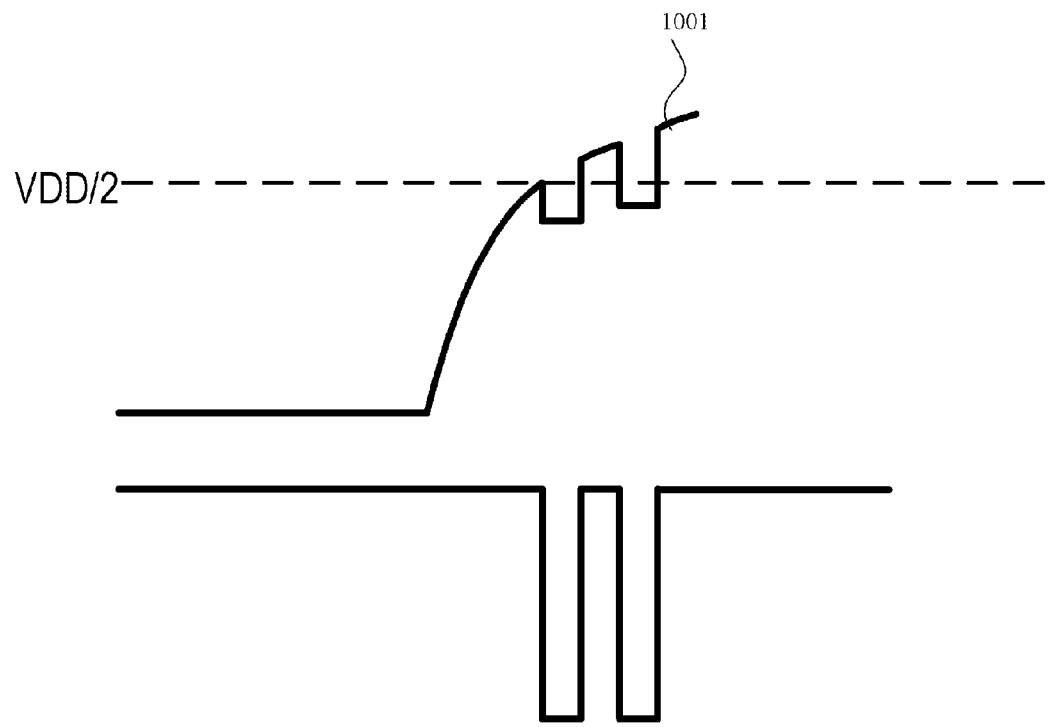
FIG. 10 illustrates an operational waveform diagram depicting the transmitting unit and the receiving units corresponding to the print article in FIG. 9 according to a preferred embodiment of the present invention.

FIG. 10 illustrates a operational waveform diagram depicting the transmitting unit and the receiving units corresponding to the print article in FIG. 9 according to a preferred embodiment of the present invention. Referring to FIG. 10, it is assumed that the I/O port RXIO-2 charges the receiving unit 92 of the I/O port RXIO-1 when the receiving unit 92 of the I/O port RXIO-1 is detected. When the receiving unit 92 of the I/O port RXIO-1 is charged to a specific voltage, such as half of the power voltage VDD/2, the control circuit 304 controls the transmitting unit to emit the detection pulse. If the receiving unit 92 of the I/O port RXIO-1 receives the detection pulse, the received signal's waveform would be as the waveform 1001. At this time, the I/O port RXIO-1 of the control circuit 304 would detects the detection pulse in the meantime.

Similarly, it is assumed that the I/O port RXIO-1 charges the receiving unit 92 of the I/O port RXIO-2 when the receiving unit 92 of the I/O port RXIO-2 is detected. When the receiving unit 92 of the I/O port RXIO-1 is charged to a specific voltage, such as half of the power voltage VDD/2, the control circuit 304 controls the transmitting unit to emit the detection pulse. If the receiving unit 92 of the I/O port RXIO-2 receives the detection pulse, the received signal's waveform would be as the waveform 1001. At this time, the I/O port RXIO-2 of the control circuit 304 would detects the detection pulse in the meantime.

According to the abovementioned embodiment, the use of discrete circuits is greatly reduced, and the thick of cover is reduced, and thus, the cost is reduced. However, the design in the abovementioned embodiment decreases the noise immunity. In order to increase the noise immunity, the detection count can be increased to enhance the noise immunity, and the misjudgment of page detection can be prevented.

In addition, comparing the embodiment in FIG. 9 and the embodiment in FIG. 6, if the design of the transmitting unit and the design of the receiving unit adopt the implementation in FIG. 6, since the signal strength of the resonant circuit is greater, the second thin conductors 306 or 706 may not be necessary. However, in the embodiment in FIG. 9, the signal strength is weaker; the second thin conductors are needed to serve as the signal transmission paths to avoid over attenuation of signal, which cause that the receiving unit 92 cannot receive the signal. However, if the design of the embodiment in FIG. 9 is adopted in a print article with few pages, the second thin conductor may not be necessary. Therefore, the design of the second thin conductors 306 or 706 is optional. The present invention is not limited thereto.

Furthermore, the abovementioned embodiment adopts the cover page (front cover or back cover) to dispose the transmitting unit(s) and receiving unit(s). However, people having ordinary skill in the art should know that to dispose the transmitting unit(s) and receiving unit(s) in any specific page can achieve the same result. The present invention is not limited thereto.

Figure 11:
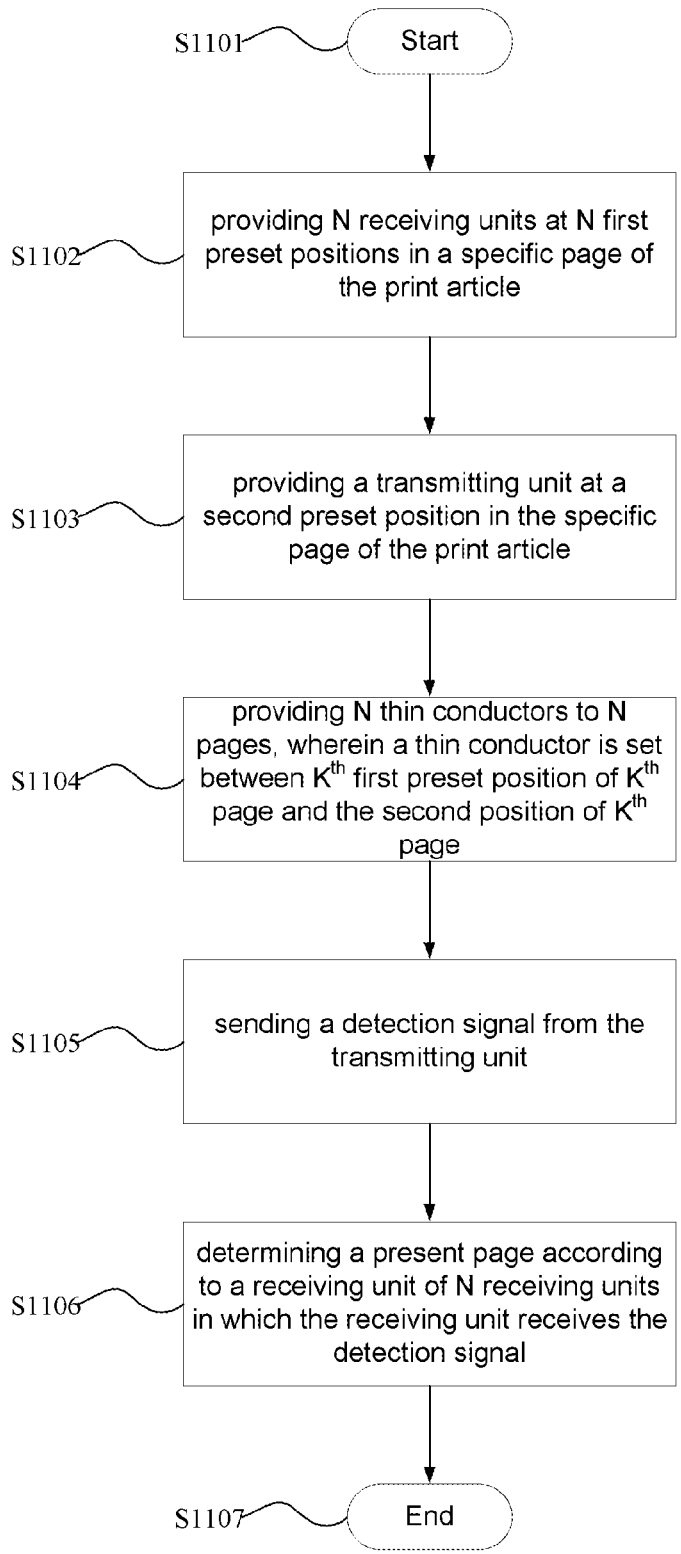
FIG. 11 illustrates a flow chart depicting an automatic page detection method for a print article according to a preferred embodiment of the present invention.

According to the embodiment in FIG. 3, an automatic page detection method for a print article can be summarized. FIG. 11 illustrates a flow chart depicting an automatic page detection method for a print article according to a preferred embodiment of the present invention. Referring to FIG. 11, the automatic page detection method for a print article includes the steps as follow.

In step S1101, the method starts.

In step S1102, N receiving units are provided respectively at N first preset positions in a specific page, such as the front cover page or the back cover page.

In step S1103, a transmitting unit is provided at the second preset position of the specific page.

In step S1104, N thin conductors are provided respectively to N page, wherein a thin conductor is set in $K^{th}$ first preset position to the second preset position of $K^{th}$ page.

In step S1105, a detection signal is emitted by transmitting unit.

In step S1106, the present page is detected according to the receiving unit of N receiving units in which the receiving unit receives the detection signal.

In step S1107, the method ends.

Figure 12:
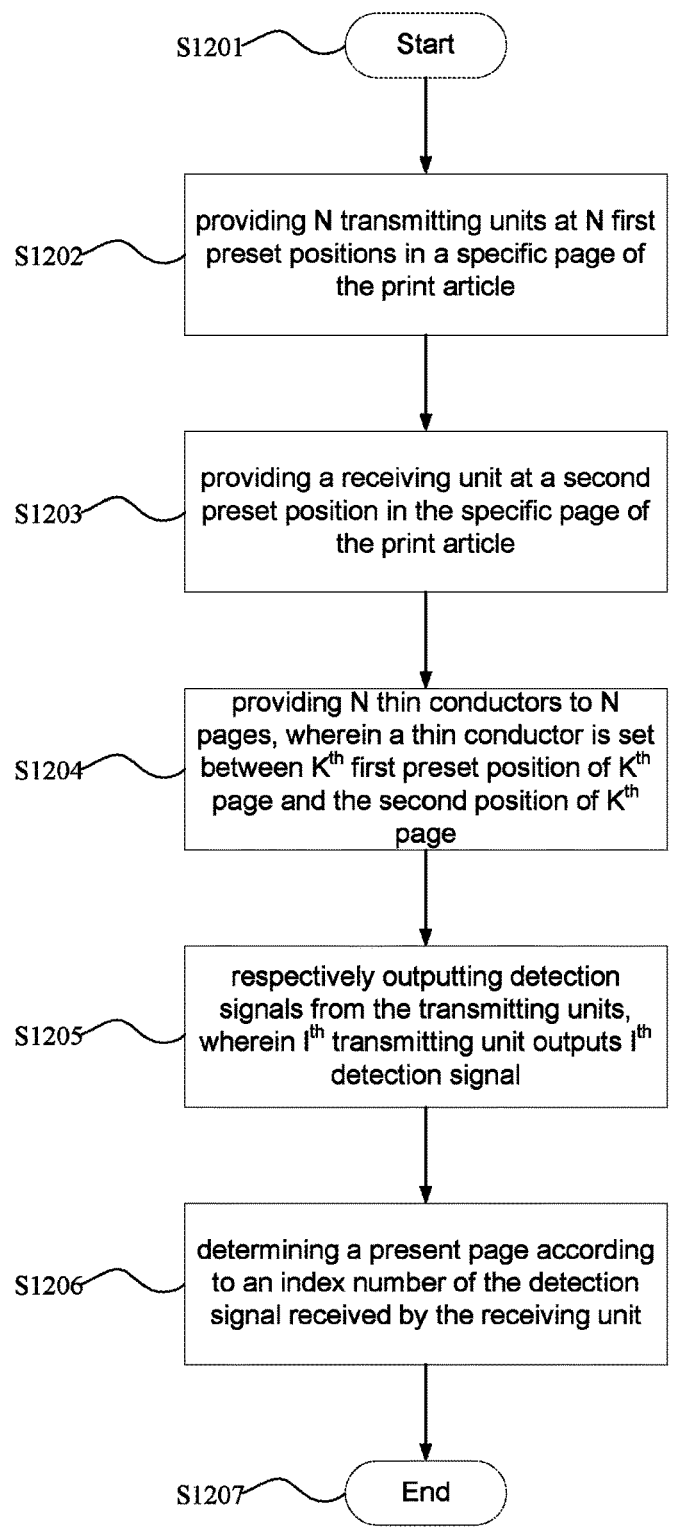
FIG. 12 illustrates a flow chart depicting an automatic page detection method for a print article according to a preferred embodiment of the present invention.

Similarly, according to the embodiment in FIG. 7, an automatic page detection method for a print article can be summarized. FIG. 12 illustrates a flow chart depicting an automatic page detection method for a print article according to a preferred embodiment of the present invention. Referring to FIG. 12, the automatic page detection method for a print article includes the steps as follow.

In step S1201, the method starts.

In step S1202, N transmitting units are provided respectively at N first preset positions in a specific page, such as the front cover page or the back cover page.

In step S1203, a receiving unit is provided at the second preset position of the specific page.

In step S1204, N thin conductors are provided respectively to N page, wherein a thin conductor is set in $K^{th}$ first preset position to the second preset position of $K^{th}$ page.

In step S1205, the detection signals are respectively output from the transmitting units, wherein $I^{th}$ transmitting unit outputs $I^{th}$ detection signal.

In step S1206, a present page is determined according to an index number of the detection signal received by the receiving unit.

In step S1207, the method ends.

In summary, the spirit of the present invention is to provide wireless signal transmitting unit(s) and wireless signal receiving unit(s), and to provide thin conductor(s) in the page(s) to be detected for providing a signal transmission path. Thus, the present page turned by user can be detected by the transmission of the wireless detection signal through the thin conductor and whether the wireless signal receiving unit receives the wireless detection signal or not.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An automatic page detection method, adapted for a print article, wherein the print article includes a plurality of pages, wherein the automatic page detection method comprises:
    providing N receiving units at N first preset positions in a specific page of the print article;
    providing a transmitting unit at a second preset position in the specific page of the print article;
    providing N thin conductors to N pages, wherein a thin conductor of thin conductors is set between $K^{th}$ first preset position of $K^{th}$ page and the second position of $K^{th}$ page;
    sending a detection signal from the transmitting unit; and
    determining a present page according to a receiving unit of N receiving units, wherein the receiving unit of N receiving units receives the detection signal,
    wherein N and K are natural number, and K<=N.

2. The automatic page detection method according to claim 1, further comprising:
    respectively disposing (N−J) second thin conductors on the $(J+1)^{th}$ first preset position to $N^{th}$ first preset position in $J^{th}$ page for providing signal transmission paths, wherein J is a natural number and J<N.

3. An automatic page detection method, adapted for a print article, wherein the print article includes a plurality of pages, wherein the automatic page detection method comprises:
    providing N transmitting units at N first preset positions in a specific page of the print article;
    providing a receiving unit at a second preset position in the specific page of the print article;
    providing N thin conductors to N pages, wherein a thin conductor of N thin conductors is set between $K^{th}$ first preset position of $K^{th}$ page and the second position of $K^{th}$ page;
    respectively outputting detection signals from the transmitting units, wherein $I^{th}$ transmitting unit outputs $I^{th}$ detection signal; and
    determining a present page according to an index number of the detection signal received by the receiving unit, wherein N and K are natural number, and K<=N.

4. The automatic page detection method according to claim 3, further comprising:
    respectively disposing (N−J) second thin conductors on the $(J+1)^{th}$ first preset position to $N^{th}$ first preset position in $J^{th}$ page for providing signal transmission paths, wherein J is a natural number and J<N.

5. A print article, comprising:
    N pages, wherein each page includes N first preset positions and a second preset position, wherein $K^{th}$ page comprises:
        a thin conductor, wherein the thin conductor is disposed between $K^{th}$ first preset position of $K^{th}$ page and the second position of $K^{th}$ page; and
    a specific page, comprising:
        N receiving units, respectively disposed on N first present positions;
        a transmitting unit, disposed on the second position;
        a control circuit, respectively coupled to the transmitting unit and N receiving units,
    wherein the control circuit controls the transmitting unit to output a detection signal, and the control circuit determines a present page according to a receiving unit of N receiving units, wherein the receiving unit of N receiving units receives the detection signal,
    wherein N and K are natural number, and K<=N.

6. The print article according to claim 5, wherein the $J^{th}$ page further comprises:
    (N−J) second thin conductors, respectively disposed on the $(J+1)^{th}$ first preset position to $N^{th}$ first preset position in $J^{th}$ page for providing signal transmission paths, wherein J is a natural number and J<N.

7. The print article according to claim 5, wherein the transmitting unit comprises:
    a transistor, comprising a base terminal, a emitter terminal and a collector terminal, wherein the base terminal of the transistor is coupled to the control circuit for receiving a resonant pulse, wherein the emitter terminal of the transistor is coupled to a common voltage;
    a resonant circuit, comprising a first terminal and a second terminal, wherein the first terminal of the resonant circuit is coupled to a power voltage, and the second terminal of the resonant circuit is coupled to the collector terminal of the transistor; and
    a transmitting conductor, coupled to the second terminal of the resonant circuit.

8. The print article according to claim 7, wherein the resonant circuit comprises:
    a resistor, comprising a first terminal and a second terminal, wherein the first terminal of the resistor is coupled to the first terminal of the resonant circuit, and the second terminal of the resistor is coupled to the second terminal of the resonant circuit;
    a capacitor, comprising a first terminal and a second terminal, wherein the first terminal of the capacitor is coupled to the first terminal of the resonant circuit, and the second terminal of the capacitor is coupled to the second terminal of the resonant circuit; and
    a inductor, comprising a first terminal and a second terminal, wherein the first terminal of the inductor is coupled to the first terminal of the resonant circuit, and the second terminal of the inductor is coupled to the second terminal of the resonant circuit.

9. The print article according to claim 5, wherein each of the receiving units comprises:
    a receiving conductor;
    a filtering unit, coupled to the receiving conductor, for performing a bandpass filter to output a bandpass signal;

a signal amplifying unit, comprising an input terminal and an output terminal, wherein the output terminal of the signal amplifying unit is coupled to the filtering unit, for amplifying the bandpass signal to output the amplified bandpass signal; and a peak detection unit, for detecting the amplified bandpass signal to output a detection pulse.

10. The print article according to claim 9, wherein the filtering unit comprises:

a capacitor, comprising a first terminal and a second terminal, wherein the first terminal of the capacitor is coupled to the receiving conductor, and the second terminal of the capacitor is coupled to a common voltage; and an inductor, comprising a first terminal and a second terminal, wherein the first terminal of the inductor is coupled to the receiving conductor, and the second terminal of the inductor is coupled to a common voltage.

11. The print article according to claim 9, wherein the signal amplifying unit comprises:

an isolation capacitor, comprising a first terminal and a second terminal, wherein the first terminal of the isolation capacitor is coupled to the filtering unit and the input terminal of the signal amplifying unit;

a transistor, comprising a base terminal, a emitter terminal and a collector terminal, wherein the base terminal of the transistor is coupled to the second terminal of the isolation capacitor, the emitter terminal of the transistor is coupled to a common voltage, and the collector terminal of the transistor is coupled to the output terminal of the signal amplifying unit;

a first resistor, comprising a first terminal and a second terminal, wherein the first terminal of the first resistor is coupled to the base terminal of the transistor, and the second terminal of the first resistor is coupled to the collector terminal of the transistor; and a second resistor, comprising a first terminal and a second terminal, wherein the first terminal of the second resistor is coupled to a power voltage, and the second terminal of the second resistor is coupled to the collector terminal of the transistor.

12. The print article according to claim 9, wherein the peak detection unit comprises:

a diode, comprising a anode and a cathode, wherein the anode of the diode is coupled to the input terminal of the signal amplifying unit;

a first capacitor, comprising a first terminal and a second terminal, wherein the first terminal of the first capacitor is coupled to the cathode of the diode, and the second terminal of the first capacitor is coupled to a common voltage;

a first resistor, comprising a first terminal and a second terminal, wherein the first terminal of the first resistor is coupled to the cathode terminal of the diode, and the second terminal of the first resistor is coupled to the common voltage; and a second resistor, comprising a first terminal and a second terminal, wherein the first terminal of the second resistor is coupled to the cathode of the diode;

a second capacitor, comprising a first terminal and a second terminal, wherein the first terminal of the second capacitor is coupled to the second terminal of the second resistor, and the second terminal of the second capacitor is coupled to the common voltage; and an amplifier, comprising a first input terminal, a second input terminal and an output terminal, wherein the first input terminal of the amplifier is coupled to the cathode of the diode, the second input terminal of the amplifier is coupled to the first terminal of the second capacitor, and the output terminal of the amplifier outputs the detection pulse.

13. The print article according to claim 5, wherein the transmitting unit comprises:

a pulse generating circuit, comprising an input terminal and an output terminal, wherein the input terminal of the pulse generating circuit is coupled to the control circuit, for output a pulse; and a transmitting conductor, coupled to the output terminal of the pulse generating circuit, wherein a $I^{th}$ receiving unit comprising:

$I^{th}$ receiving conductor, coupled to the $I^{th}$ input/output pin;

wherein an impedance element is between the $(I+1)^{th}$ input/output pin and the $I^{th}$ input/output pin, wherein, when the $(I+1)^{t}$ input/output pin charges the $I^{th}$ input/output pin to a specific voltage, the control circuit controls the pulse generating circuit to output the pulse, and the control circuit determines the present page according to whether the voltage of the $I^{th}$ input/output pin is smaller than the specific voltage or not.

14. The print article according to claim 5, wherein the transmitting unit comprises:

a pulse generating circuit, comprising an input terminal and an output terminal, wherein the input terminal of the pulse generating circuit is coupled to the control circuit, for output a pulse; and a transmitting conductor, coupled to the output terminal of the pulse generating circuit, wherein a $I^{th}$ receiving unit comprising:

$I^{th}$ receiving conductor, coupled to the $I^{th}$ input/output pin;

wherein an impedance element is between the $(I-1)^{th}$ input/output pin and the input/output pin, wherein, when the $(I-1)^{th}$ input/output pin charges the $I^{th}$ input/output pin to a specific voltage, the control circuit controls the pulse generating circuit to output the pulse, and the control circuit determines the present page according to whether the voltage of the $I^{th}$ input/output pin is smaller than the specific voltage or not.

15. A print article, comprising:

N pages, wherein each page includes N first preset positions and a second preset position, wherein each page comprises a thin conductor, wherein the thin conductor is disposed between $K^{th}$ first preset position of $K^{th}$ page and the second position of $K^{th}$ page;

a specific page, comprising:

N transmitting units, respectively disposed on N first present positions;

a receiving unit, disposed on the second position;

a control circuit, respectively coupled to the receiving unit and N transmitting units, wherein the control circuit controls the N transmitting units to respectively output a first detection signal to $N^{th}$ detection signal, and the control circuit determines a present page according to an index number of received detection signal received by the receiving unit, wherein N and K are natural number, and K<=N.

16. The print article according to claim 5, wherein the $J^{th}$ page further comprises:

(N−J) second thin conductors, respectively disposed on the $(J+1)^{th}$ first preset position to $N^{th}$ first preset position in $J^{th}$ page for providing signal transmission paths, wherein J is a natural number and J<N.

17. The print article according to claim 15, wherein each transmitting unit comprises:

a transistor, comprising a base terminal, a emitter terminal and a collector terminal, wherein the base terminal of the transistor is coupled to the control circuit for receiving a resonant pulse, wherein the emitter terminal of the transistor is coupled to a common voltage;

a resonant circuit, comprising a first terminal and a second terminal, wherein the first terminal of the resonant circuit is coupled to a power voltage, and the second terminal of the resonant circuit is coupled to the collector terminal of the transistor; and a transmitting conductor, coupled to the second terminal of the resonant circuit.

18. The print article according to claim 17, wherein the resonant circuit comprises:

a resistor, comprising a first terminal and a second terminal, wherein the first terminal of the resistor is coupled to the first terminal of the resonant circuit, and the second terminal of the resistor is coupled to the second terminal of the resonant circuit;

a capacitor, comprising a first terminal and a second terminal, wherein the first terminal of the capacitor is coupled to the first terminal of the resonant circuit, and the second terminal of the capacitor is coupled to the second terminal of the resonant circuit; and an inductor, comprising a first terminal and a second terminal, wherein the first terminal of the inductor is coupled to the first terminal of the resonant circuit, and the second terminal of the inductor is coupled to the second terminal of the resonant circuit.

19. The print article according to claim 15, wherein the receiving unit comprises:

a receiving conductor;

a filtering unit, coupled to the receiving conductor, for performing a bandpass filter to output a bandpass signal;

a signal amplifying unit, comprising an input terminal and an output terminal, wherein the output terminal of the signal amplifying unit is coupled to the filtering unit, for amplifying the bandpass signal to output the amplified bandpass signal; and a peak detection unit, for detecting the amplified bandpass signal to output a detection pulse.

20. The print article according to claim 19, wherein the filtering unit comprises:

a capacitor, comprising a first terminal and a second terminal, wherein the first terminal of the capacitor is coupled to the receiving conductor, and the second terminal of the capacitor is coupled to a common voltage; and an inductor, comprising a first terminal and a second terminal, wherein the first terminal of the inductor is coupled to the receiving conductor, and the second terminal of the inductor is coupled to a common voltage.

21. The print article according to claim 19, wherein the signal amplifying unit comprises:

an isolation capacitor, comprising a first terminal and a second terminal, wherein the first terminal of the isolation capacitor is coupled to the filtering unit and the input terminal of the signal amplifying unit;

a transistor, comprising a base terminal, a emitter terminal and a collector terminal, wherein the base terminal of the transistor is coupled to the second terminal of the isolation capacitor, the emitter terminal of the transistor is coupled to a common voltage, and the collector terminal of the transistor is coupled to the output terminal of the signal amplifying unit;

a first resistor, comprising a first terminal and a second terminal, wherein the first terminal of the first resistor is coupled to the base terminal of the transistor, and the second terminal of the first resistor is coupled to the collector terminal of the transistor; and a second resistor, comprising a first terminal and a second terminal, wherein the first terminal of the second resistor is coupled to a power voltage, and the second terminal of the second resistor is coupled to the collector terminal of the transistor.

22. The print article according to claim 19, wherein the peak detection unit comprises:

a diode, comprising a anode and a cathode, wherein the anode of the diode is coupled to the input terminal of the signal amplifying unit;

a first capacitor, comprising a first terminal and a second terminal, wherein the first terminal of the first capacitor is coupled to the cathode of the diode, and the second terminal of the first capacitor is coupled to a common voltage;

a first resistor, comprising a first terminal and a second terminal, wherein the first terminal of the first resistor is coupled to the cathode terminal of the diode, and the second terminal of the first resistor is coupled to the common voltage; and a second resistor, comprising a first terminal and a second terminal, wherein the first terminal of the second resistor is coupled to the cathode of the diode;

a second capacitor, comprising a first terminal and a second terminal, wherein the first terminal of the second capacitor is coupled to the second terminal of the second resistor, and the second terminal of the second capacitor is coupled to the common voltage; and an amplifier, comprising a first input terminal, a second input terminal and an output terminal, wherein the first input terminal of the amplifier is coupled to the cathode of the diode, the second input terminal of the amplifier is coupled to the first terminal of the second capacitor, and the output terminal of the amplifier outputs the detection pulse.

23. The print article according to claim 15, wherein, when the print article detects present page, a detection period is comprised, wherein the detection period is divided into N sub-detection periods, wherein the control circuit in $I^{th}$ sub-detection period sends $I^{th}$ detection signal, wherein, in $I^{th}$ sub-detection period, the control circuit detects the $I^{th}$ detection signal received by the receiving unit, and the control circuit in $(I+1)^{th}$ sub-detection period does not detect the $(I+1)^{th}$ detection signal received by the receiving unit, the control circuit determines the present page is the page corresponding to the $I^{th}$ detection signal, wherein I is a natural number, and I<N.

* * * * *